S. A. KELLER.
INCUBATOR.
APPLICATION FILED MAR. 12, 1921.

1,410,065.

Patented Mar. 21, 1922.
2 SHEETS—SHEET 2.

Inventor:
S. A. Keller.

By
Attorneys.

UNITED STATES PATENT OFFICE.

SIMEON A. KELLER, OF KNOXVILLE, TENNESSEE.

INCUBATOR.

1,410,065.　　　　Specification of Letters Patent.　　Patented Mar. 21, 1922.

Application filed March 12, 1921. Serial No. 451,664.

*To all whom it may concern:*

Be it known that I, SIMEON A. KELLER, a citizen of the United States, residing at Knoxville, in the county of Knox and State of Tennessee, have invented new and useful Improvements in Incubators, of which the following is a specification.

This invention relates to incubators which are electrically heated, and its object is to provide a novel and improved means for automatically controlling the temperature in the egg-chamber of the incubator so that the heat can be kept uniform regardless of outside temperature conditions.

The invention also has for its object to provide for the uniform distribution of heated air to the egg chamber.

The objects stated are attained by means of a combination and arrangement of parts to be hereinafter described and claimed, and in order that the same may be understood, reference is had to the accompanying drawing, forming a part of this specification.

In the drawing,

Fig. 3 is a cross section at a right angle to the plane of the section on which Fig. 2 is taken, and.

Figure 1:
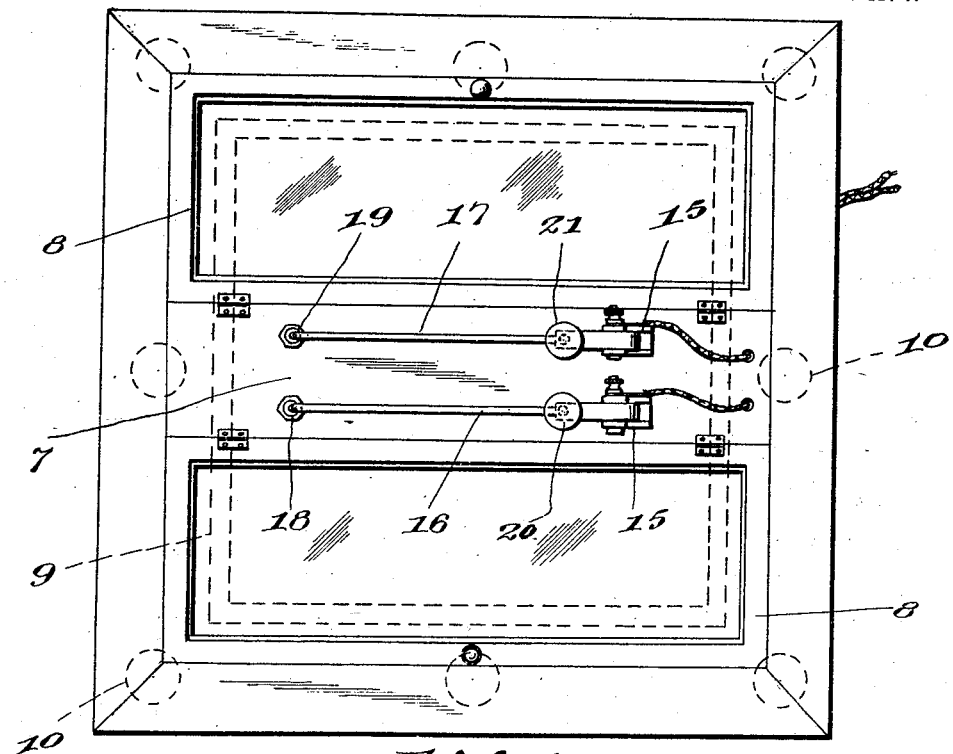
Figure 1 is a plan view of the apparatus.
Figure 2:
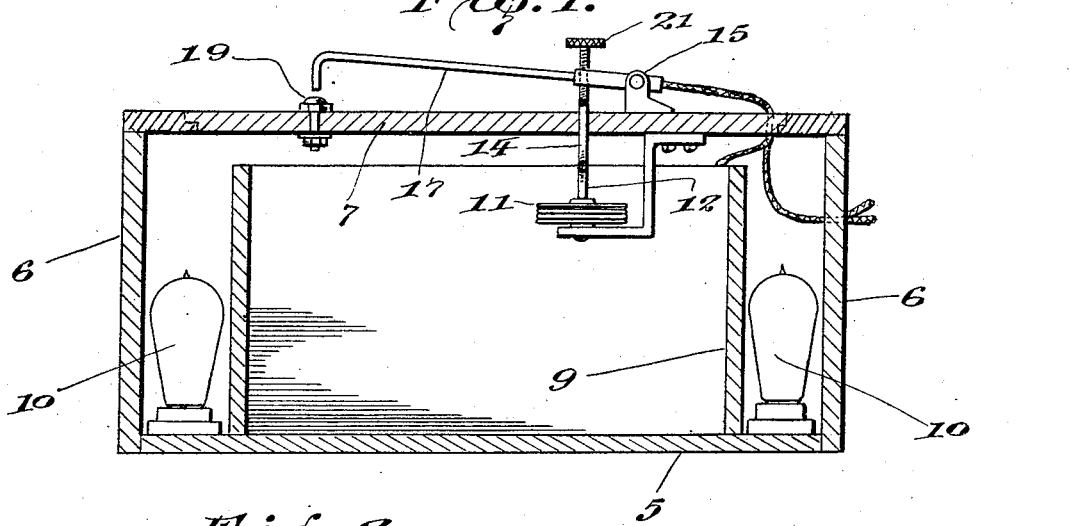
Fig. 2 is a central cross-section thereof.
Figure 3:
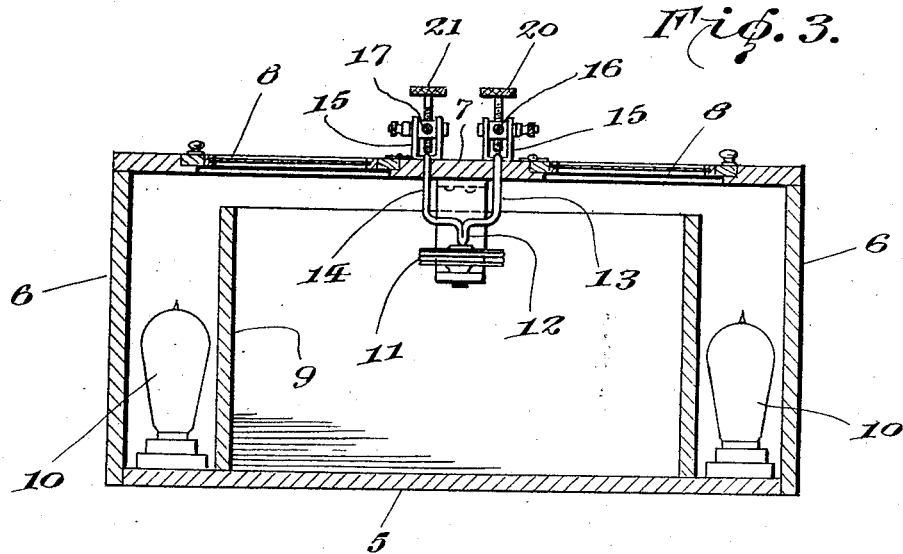
Figure 4:
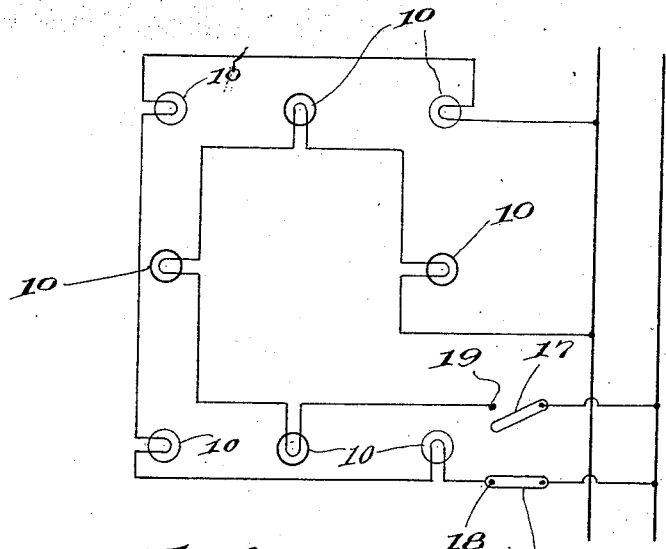
Fig. 4 is a diagram showing the electric circuit.

Referring specifically to the drawing, the casing of the incubator comprises a bottom 5, sides 6 and a top 7, the latter occupying only the medial portion of the casing so as to leave spaces on opposite sides of the top for hinged doors 8 through which access to the interior of the casing is had. These doors are glazed so that the interior of the casing may be viewed without swinging the doors open.

Into casing hereinbefore described is built an egg-chamber composed of walls 9 rising from the bottom 5 and terminating short of the top 7 and its doors 8. The walls 9 are parallel to and spaced from the side walls 6 of the casing to form an air-heating space around the egg-chamber, in which space are located electric heating elements, such as incandescent lamps 10. The air heated in the space around the egg chamber rises in said space and passes over the walls 9 into the egg-chamber.

Two groups of lamps 10, in parallel series, are provided, and a means is provided for controlling the groups of lamps to regulate the temperature of the interior of the incubator. This temperature controlling or regulating means comprises the following parts:

On the under side of the top wall 7 of the casing, above the egg-chamber, is mounted a thermostat of ordinary construction having an expansible element 11 which is responsive to temperature changes as usual. From the element 11 rises a rod 12 which moves up and down with said element as it expands and contracts. The upper end of the rod 12 has two upstanding branches 13 and 14, which pass through apertures in the wall 7.

On top of the wall 7 are two brackets 15 pivotally supporting levers 16 and 17, adapted to have their rear ends engage contacts 18 and 19, respectively, said contacts being also carried by the wall 7. The lever 16 carries a vertically positioned screw 20, and the lever 17 carries a similar screw 21. The screw 20 is in alinement with the branch 13 of the thermostat rod 12, and the screw 21 is in alinement with the branch 14.

One group of four, or any other number of lamps 10, is controlled by the lever 16, and another group is controlled by the lever 17, the circuit connections being made with the levers and the respective contacts 18 and 19 engageable thereby. The arrangement is such that when the lever 16 is engaging the contact 18, one group of lamps is cut in, whereas when the lever 17 engages the contact 19, the other group is cut in. The screws 20 and 21 will be so positioned with respect to the branches 13 and 14 of the thermostat rod that the latter normally does not touch the same. The screws will be so adjusted that they are spaced different distances from the thermostat rod branches. It will therefore be evident that when the temperature in the incubator rises sufficiently to cause the thermostat to expand to a degree to move the rod 12 and its branches 13 and 14 upwardly, the screws 20 and 21 will be pushed upwardly, whereby the levers 16 and 17 are swung off the contacts 18 and 19. The levers are not operated simultaneously in this manner, but as stated hereinbefore the screws of the levers will be set spaced different distances from the thermostat rod branches, and hence the lever carrying the screw which is set closest, is operated first.

By the construction hereinbefore described the heat can be kept uniform regardless of the condition of the outside temperature. Ordinarily one group of lamps suffices to maintain the desired temperature in the incubator, and the second group need not be used except in extreme cold weather. The adjustment for this purpose is made as follows:

Assuming that the lever 16 is the one chosen to cut out a group of lamps when the temperature rises beyond a predetermined degree, then the screw 20 of this lever is so adjusted relative to the thermostat rod branch 13 that the latter operates the lever when this rise of temperature takes place. At the same time the screw 21 of the lever 17 is so adjusted that it is in contact with the branch 14 and holding said lever off its contact 19 during normal temperature conditions in the incubator. It will therefore be seen that a rise in the desired temperature affects only the first mentioned group of lamps, but if the temperature drops below the desired degree, the contraction of the thermostat and the consequent lowering of the branch 14, allows the lever 17 to swing down and close the circuit of the second group of lamps, and when the temperature again rises to the normal, this group is cut out.

The air heated by the lamps in the space around the egg-chamber is uniformly distributed, and all portions of the egg-chamber receive the same amount of heat. The lamps are so arranged that with either group cut out, the lamps of the other group are uniformly spaced around the outside of the egg-chamber.

I claim:

1. In an incubator, an electric heating element, a switch controlling said element, a thermostat for opening the switch upon a rise in temperature beyond a predetermined degree, a second heating element, a switch controlling the second-mentioned element, and means controlled by the aforesaid thermostat for closing the second mentioned switch upon a drop in temperature below a predetermined degree.

2. In an incubator, an electric heating element, a switch mechanism controlling said element, said mechanism including a lever, a second electric heating element, a switch mechanism controlling the second heating element and including a lever, actuators for the aforesaid levers, and a thermostat, controlling the actuators, one actuator operating on a rise of temperature above a predetermined degree, and the other actuator on a drop of temperature below said predetermined degree.

3. In an incubator, an electric heating element, a switch mechanism controlling said element, said mechanism including a lever, a second electric heating element, a switch mechanism controlling the second heating element and including a lever, actuators for the aforesaid levers, a thermostat controlling the actuators, and members carried by the levers and engageable by the actuators for operating the levers, said members being adjustable relative to the actuators, one actuator operating on a rise of temperature above a predetermined degree, and the other actuator operating on a drop of temperature below said predetermined degree.

4. In an incubator, an electric heating element, a switch mechanism controlling said element, said mechanism including a lever, a second electric heating element, a switch mechanism controlling the second heating element and including a lever, actuators for the aforesaid levers, a thermostat controlling the actuators, and screws carried by the levers for engagement by the actuators to effect the operation of the levers, said screws being adjustable toward and from the actuators, one actuator operating on a rise of temperature above a predetermined degree, and the other actuator operating on a drop of temperature below said predetermined degree.

In testimony whereof I affix my signature.

SIMEON A. KELLER.